United States Patent [19]

Häfele

[11] Patent Number: 4,829,951
[45] Date of Patent: May 16, 1989

[54] INJECTION PUMP CAMSHAFT

[75] Inventor: Walter Häfele, Fellbach, Fed. Rep. of Germany

[73] Assignee: Robert Bosch GmbH, Stuttgart, Fed. Rep. of Germany

[21] Appl. No.: 218,423

[22] Filed: Jul. 11, 1988

Related U.S. Application Data

[63] Continuation of Ser. No. 421,181, Aug. 5, 1982, abandoned.

[30] Foreign Application Priority Data

Jul. 2, 1982 [DE] Fed. Rep. of Germany ....... 3224762

[51] Int. Cl.4 .......................... F01L 1/04; F02M 59/10
[52] U.S. Cl. .................................. 123/90.6; 123/495; 74/567
[58] Field of Search ............... 123/90.27, 90.60, 90.17, 123/90.18, 509, 495; 29/156.4 R; 74/55, 56, 567; 417/490, 499

[56] References Cited

U.S. PATENT DOCUMENTS

| | | | |
|---|---|---|---|
| 3,272,189 | 9/1966 | Turkish | 123/90.6 |
| 3,666,382 | 5/1972 | Rasmussen | 74/55 X |
| 4,335,686 | 6/1982 | Herdin et al. | 123/90.6 |
| 4,388,897 | 6/1983 | Rosa | 123/90.6 X |

FOREIGN PATENT DOCUMENTS

| | | | |
|---|---|---|---|
| 253300 | 3/1967 | Austria . | |
| 78114 | 6/1980 | Japan | 123/90.6 |
| 78115 | 6/1980 | Japan | 123/90.6 |
| 96310 | 6/1980 | Japan | 123/90.6 |

Primary Examiner—Willis R. Wolfe
Attorney, Agent, or Firm—Edwin E. Greigg

[57] ABSTRACT

A camshaft for a fuel injection pump of internal combustion engines, having reinforcements formed concentrically or following parallel to the cam outline and located adjacent the cams, and/or these and the camshaft bearings having a diameter enlarged in respect to the shaft diameter.

7 Claims, 1 Drawing Sheet

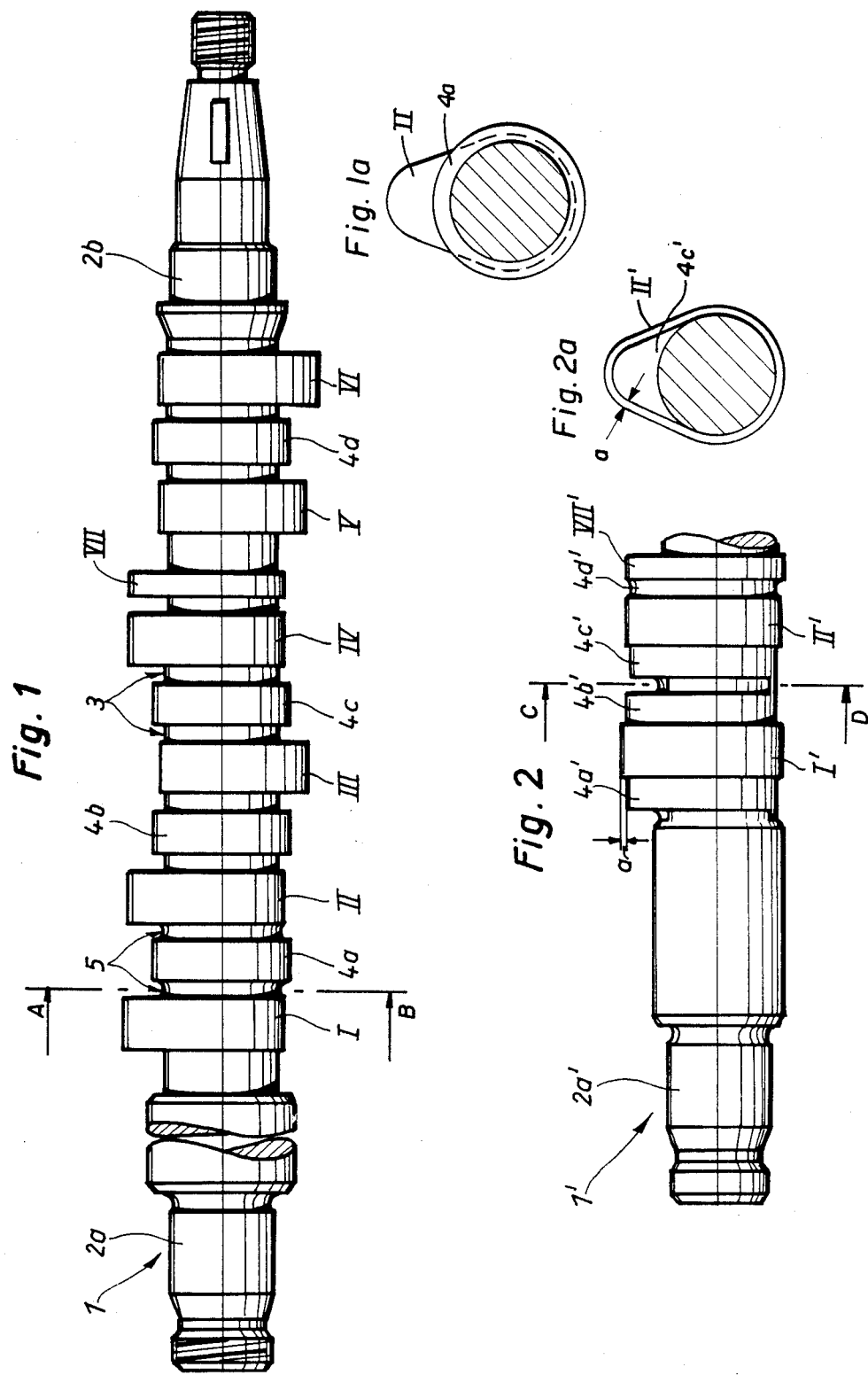

INJECTION PUMP CAMSHAFT

This is a continuation of copending application Ser. No. 421,181, filed Aug. 5, 1982, now abandoned.

BACKGROUND OF THE INVENTION

The invention is based on a camshaft for an injection pump as revealed hereinafter. It is known (Austrian Pat. No. 253 300, Austrian Pat. No. 264 209) to support camshafts for injection pumps for internal combustion engines at their ends or, in the case of longer camshafts, as for instance in engines with more than four cylinders, to provide intermediate bearings. However, in the known injection pumps these intermediate bearings are mainly used to avoid possible knocking or uneven running caused by too large an axial play of the camshaft during uneven heat expansion of the injection pump housing on the one hand and the camshaft on the other. In order to offset the differing heat expansion coefficients between injection pump housing and camshaft resulting therefrom, in known injection pumps at least one bearing of the camshaft is fixed and the other axially displacably mounted in the pump housing and the bearings are interconnected with each other by connecting members disposed in the same chamber as the camshaft. Furthermore, the material of the connecting members has substantially the same or almost the same heat expansion coefficient as the material of the camshaft. The construction of the camshaft is such that the shaft has a constant diameter, with the exception of the end bearings, on which the cam means, having the usual noncircular shape, are disposed at the prescribed distance which makes possible the actuation of the pump pushrods.

It is further known in a camshaft for internal combustion engines with fuel injection (German Offenlegungsschrift No. 29 45 873) corresponding to U.S. Pat. No. 4,335,686), to dispose between the cams for the actuation of the usual pushrods of the inlet and outlet valves for the operation of a tappet of a fuel injection pump fuel unit injector. Additionally, it is possible to dispose such pump camming means on the engine camshaft because thepump cam, although overlapping at least one of the adjacent valve pushrods, has a shape in the area of this overlap which lines within a predetermined curve, so that collision between the pump cam and the valve pushrod is impossible.

The known injection pumps cannot correct for sagging or other general problems, such as excessive vibration, in the case of long injection pump camshafts, and insufficient cross-directional rigidity of the camshaft. Such sagging, for example, can create considerable stress at the main bearings and thus can cause irregularities in operation of the mechanism. U.S. Pat. No. 3,272,189 addresses this problem and offers a solution which accepts this conventional type of sagging.

OBJECT AND SUMMARY OF THE INVENTION

In contrast to the foregoing, the camshaft for an injection pump for internal combustion engines as disclosed in the ensuing specification has the advantage that sagging of the camshaft is practically non-existent or significantly reduced. Accordingly, where longer camshafts are required an intermediate bearing usually can be omitted. Furthermore, as will be readily understood from this disclosure, considerable relief of the main bearings is achieved as well as a more uniform and therefore more precise injection stroke during the operation of the pump.

Virtually no increased manufacturing effort is necessary to provide for the additional disc-like concentric or following-the-cam-contour cam reinforcements, since the camshafts proposed herein are manufactured in the same way. The material difference is that a series of reinforcement areas are conjoined with the cam lobes and are in close proximity therewith. Furthermore, these reinforcement areas do not require any material changes in the manufacturing operation since they merely serve to reinforce and stiffen the camshaft as a whole. Moreover, these reinforcements also can be achieved by the usual skilled mechanic during the camshaft grinding operation. It will be apparent that this camshaft design is proportioned in such a way that the roller tappets do not touch the stiffening discs at any time, not even at bottom dead center.

The invention will be better understood and further objects and advantages thereof will become more apparent from the ensuing detailed description of preferred embodiments taken in conjunction with the drawings.

BRIEF DESCRIPTION OF THE DRAWINGS

Two exemplary embodiments of the present invention are shown in the drawings and are explained in greater detail in the following description.

FIG. 1 shows in horizontal elevation a first exemplary embodiment of a camshaft with reinforcement discs located between the cams, the outer contours of the discs being concentric to the general shaft diameter.

FIG. 1a is a cross section of FIG. 1.

FIG. 2 shows a fragmentary view of a second exemplary embodiment of the present invention, in which the reinforcement discs have an outer contour following the general shape of the cams.

FIG. 2a is a cross section of FIG. 2.

DESCRIPTION OF THE PREFERRED EMBODIMENTS

The camshaft 1 shown in FIG. 1 in this exemplary embodiment includes, besides the two end bearing surfaces or journals 2a and 2b, six cams I through VI for actuating the roller tappets of the injection pump, and a supply pump eccentric element VII. In each of the free spaces between the cams I to IV or VII and/or the cams on the one hand and the bearings surfaces 2a and 2b on the other, or generally in any place where there are free spaces created by the distance between sections of the shafts having specific functions, reinforced areas 4a, 4b, 4c, 4d are provided. In the examplary embodiment of FIG. 1 these spaces are occupied by concentric reinforcement means which are formed by an appropriate enlargement of the shaft diameter. Each of these reinforcements is of such a thickness that it forms no interference with the roller tappets, either with respect to the machining of the camshaft or during the latter operation. The transitions from the cam means to the disc-like reinforcement areas are formed as annular recesses, as shown at 3. In the alternative it would be possible to form the transitions between the discs and cams in such a way as to reduce a notch effect, i.e., they could be rounded and follow a radial outline such as shown at 5. In other words, the areas on opposite sides of the reinforcement means which conjoin the cam means are scalloped as clearly shown in FIG. 1.

In the only partially shown exemplary embodiment in FIG. 2, parts which are the same or equivalent to corresponding parts of the camshaft of FIG. 1 are given the same reference numerals, differentiated only by a prime sign. In this second exemplary embodiment the reinforcements are, to the extent permitted by the space available, preferably formed on both sides of the cams I', II', VII' in such a way that their contour generally approximates the corresponding cam shape or is substantially equivalent to it. The transition between the reinforcements, either amongst themselves or with parts of the shaft, again follows the rounded radial outline as noted supra. The reinforcements shown in FIG. 2 and designated 4a', 4b', 4c', 4d' are recessed by a predetermined amount "a" of preferably 0.5 mm from the periphery of the cam. These cam contour reinforcements 4a', 4b', 4c', 4d' are placed immediately abutting the respective cams I', II', VII'. It should be understood that it would also be possible to combine on one camshaft cam contour reinforcements 4a', 4b', 4c', 4d' from FIG. 2 and concentric reinforcements 4a, 4b . . . from FIG. 1.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A camshaft for an injection pump of an internal combustion engine provided with suitable bearing journals at least at each end of said camshaft, said camshaft having a longitudinal axis and further provided with a plurality of linearly spaced cam means having a contour for actuation of pump pushrods arranged along the longitudinal extent of said camshaft, said camshaft includes a plurality of reinforcements alternately disposed in each space between two adjacent linearly spaced cam means which space is unoccupied by another structure for preventing deflection of said camshaft from its longitudinal axis during rotation thereof, said plurality of reinforcements comprises discs, the diameter of said discs being greater than a basic circle of said cam means and equally spaced from adjacent cam means by similar annular recesses.

2. A camshaft in accordance with claim 1, in which each of said reinforcements are formed by discs including a concentric periphery with respect to the longitudinal axis and said camshaft.

3. A camshaft in accordance with claim 1, in which each of said reinforcements have a periphery generally simulating the contour of said cam means.

4. A camshaft in accordance with claim 1, in which said reinforcements are conjoined to said cam means by scalloped areas.

5. A camshaft in accordance with claim 3, in which said reinforcements which simulate the contour of said cam means are recessed by a predetermined distance approximating 0.5 mm beneath the contour of an adjacent cam means.

6. A camshaft for an injection pump of an internal combustion engine provided with suitable bearing journals at least at each end of said camshaft, said camshaft having a longitudinal axis and further provided with linearly spaced cam means, each said cam means having side faces, and a contour for actuation of pump pushrods arranged along the longitudinal extent of said camshaft, in which said camshaft includes a plurality of reinforcements with one each of said refinforcements located immediately adjacent said side faces of said cam means for preventing departure of said camshaft from its longitudinal axis during rotation thereof, said reinforcements have a periphery generally following the contour of said cam means and being recessed by a predetermined distance approximately 0.5 mm beneath the contour of an adjacent cam means.

7. A camshaft in accordance with claim 6, in which said reinforcements are conjoined to said cam means by scalloped areas.

* * * * *